K. E. BARTH.
PROCESS FOR RECOVERING THE VAPORS OF VOLATILE LIQUIDS.
APPLICATION FILED APR. 7, 1914.
1,264,479.
Patented Apr. 30, 1918.
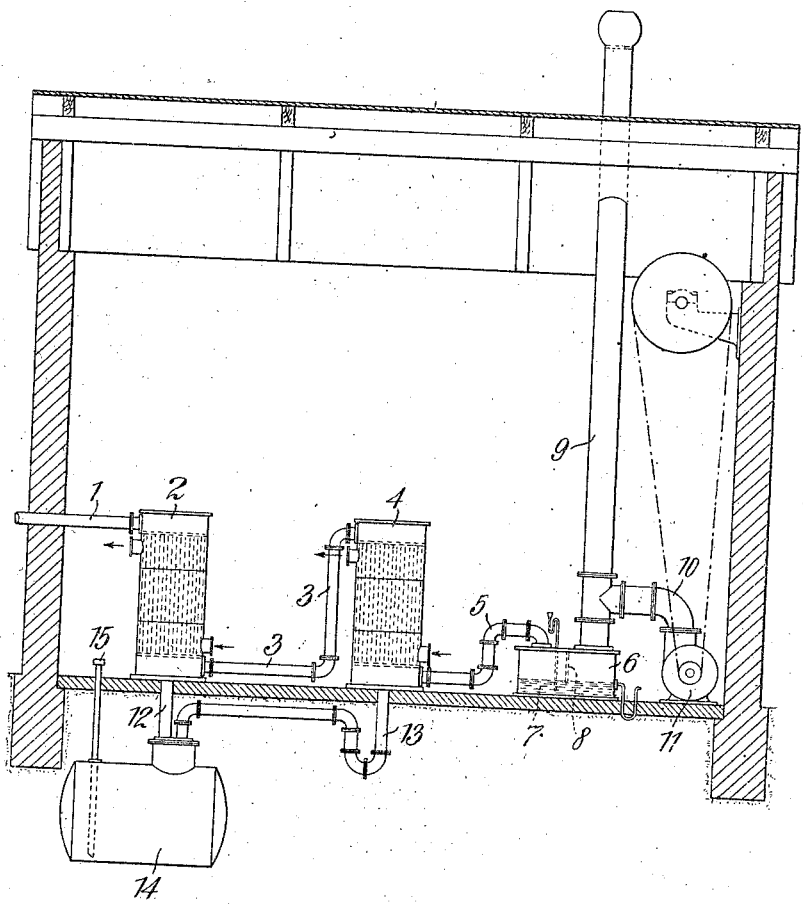

UNITED STATES PATENT OFFICE.

KURT EMIL BARTH, OF CHARLOTTENBURG, GERMANY, ASSIGNOR TO BERLIN-ANHALTISCHE MASCHINENBAU-AKTIEN-GESELLSCHAFT, OF BERLIN, GERMANY, A CORPORATION OF GERMANY.

PROCESS FOR RECOVERING THE VAPORS OF VOLATILE LIQUIDS.

1,264,479.   Specification of Letters Patent.   Patented Apr. 30, 1918.

Application filed April 7, 1914. Serial No. 830,100.

*To all whom it may concern:*

Be it known that I, KURT EMIL BARTH, a citizen of the German Empire, and resident of Charlottenburg, Germany, have invented certain new and useful Improvements in Processes for Recovering the Vapors of Volatile Liquids, of which the following is a specification.

When gasolene, kerosene, or the like is stored in large tanks, the upper portion of the tank, above the level of the inflammable liquid, is filled either with atmospheric air or with a non-oxidizable protecting gas introduced into the tank for this purpose. In the course of time this air or gas becomes saturated with vapors of the inflammable liquid, and when the tank is filled anew, the air or gas, laden with vapors, and therefore often of an explosive character, escapes into the surrounding air, entailing a loss of the valuable vapors of the inflammable liquid.

Upon attempting to recover these vapors by cooling them with water, say to 15° centigrade (this being the average temperature of cooling water), it is found that only a very small portion of the inflammable liquid will be condensed. Owing to the fact that the gases generally are not fully saturated with vapors of the inflammable liquid when the air has a temperature of say 30° centigrade, the major portion of such vapors will not condense until the temperature falls below the dew point of the mixture of gas and vapors.

According to my present invention, a very efficient recovery of the vapors of the inflammable liquid is obtained by first cooling the mixture of gas and vapors by ordinary air-cooling or water-cooling, and then cooling to a still lower temperature, by means of artificial refrigerating agents, preferably to or below 0° centigrade. Only by this additional cooling does it become possible to recover by condensation, the major portion of the vapors contained in the air or gas above the liquid. The complete recovery of these vapors could be obtained only by cooling to an exceedingly low temperature (as low as 273° centigrade below zero), which of course cannot be produced in a commercial process. In view of the fact that in practice the cooling is continued only to about 0° centigrade, a small proportion of vapors still remains in the gas mixture finally allowed to escape into the air. According to a further feature of my invention (which feature however need not be employed in every case), the escaping gas mixture receives an addition of air or of non-oxidizable gas in such proportions that the percentage of admixed vapors of the inflammable liquid will be reduced below the lowest explosion limit, so that there will be no danger of the gas mixture's exploding when it is allowed to escape into the surrounding air.

For the sake of an economical operation, the process, when carried out in connection with gasolene tanks, for example, consists in first cooling the mixture of air and gasolene vapors to about 15° centigrade in a water cooler, and then to about 0° centigrade in another cooler employing artificially refrigerated salt solutions, whereby as large a proportion of gasolene vapors as possible is separated and recovered by condensation. Since the mixture of gasolene vapors and air which leaves the second cooler at a temperature of about 0° centigrade, is still within explosive limits, such mixture, according to my invention, before it is allowed to escape into the surrounding air, receives an addition of air or of a non-oxidizable gas so as to dilute it to a point below the lower explosion limit and thus render it absolutely safe.

Experiments have shown that in the case of fully saturated mixtures of air and gasolene vapors, at a temperature of 30° centigrade, about 73% of the total amount of gasolene vapors can be separated and recovered by cooling to a temperature of 0° centigrade, about ⅔ of this amount being recovered during the first stage, when the mixture is cooled by water from 30° to about 15° centigrade, while the remaining ⅓ is recovered during the second stage, when the cooling from 15° to 0° centigrade is effected by means of brine or other artificially cooled salt solutions. Of course, if the mixture of air and gasolene vapors is not saturated, the proportions of recovery during the two stages will be different from the figures given above.

In the accompanying drawings I have illustrated, in a diagrammatic vertical section, an example of an apparatus for carrying out my invention.

From the gasolene storage tank (not shown) a pipe 1 conveys the mixture of air and vapor mixture to the upper portion of a cooler 2, which may be constructed as shown, comprising pipes through which the gaseous mixture flows, while cooling water circulates around the pipes. From the lower part of the cooler 2 a conduit 3 leads to the upper portion of a tubular cooler 4, through the pipes of which the gaseous mixture flows, while around the pipes circulates the brine or other cooling medium artificially refrigerated in a machine of any usual or approved type.

The conduit 5 leading from the lower part of the cooler 4 terminates in the cover of a receptacle 6 serving as a liquid seal, said receptacle being provided at its central portion with a depending partition 8 dipping into the liquid 7 (for instance, water). While the conduit 5 connects with the compartment at the left of the partition 8, the compartment at the right of said partition communicates with the conduit 9 which leads from the cover of the receptacle 6 to the surrounding air. With the lower portion of the conduit 9, above the receptacle 6, is connected the pressure pipe or delivery pipe 10 of a blower 11.

The gasolene deposited in the lower portions of the coolers 2 and 4 is conveyed through the conduits 12 and 13 respectively into the underground collector 14, from which it may be withdrawn through a pipe 15.

After the mixture of air and gasolene vapors has been deprived of the major portion of its gasolene vapor contents in the coolers 2 and 4, it passes through the liquid seal 6, 7, 8 into the conduit 9. In the lower portion of this conduit, air or a non-oxidizable gas is injected by the blower 11 by way of the delivery pipe 10, thereby diluting the remainder of the air and vapor mixture to such an extent as to bring it below the lower explosion limit for mixtures of air and gasolene vapors. The resulting harmless, that is to say, non-explosive mixture, may then safely be allowed to escape into the surrounding air through the conduit 9.

The partition 8 of the receptacle 6 should dip into the liquid 7 to such a depth that when the storage tank connected with the pipe 1 is emptied, air may enter the recovery plant so that a vacuum will not be produced in said tank.

Various modifications may be made without departing from the nature of my invention as set forth in the appended claims.

1. The process of recovering vapors of inflammable liquids from gaseous mixtures containing such vapors, which consists in first cooling said mixture to about ordinary atmospheric temperature, then further cooling to a temperature materially below ordinary atmospheric temperature, separating the liquid resulting from condensation, and diluting the remainder of the mixture with a suitable gaseous agent to render it non-explosive before its escape into the surrounding air.

2. The process of recovering vapors of inflammable liquids from gaseous mixtures containing such vapors, which consists in cooling said mixture so as to condense said vapors, separating the condensation product, and diluting the remainder of the mixture with a suitable gaseous agent to insure its non-explosiveness.

In testimony whereof, I have signed this specification in the presence of two subscribing witnesses.

KURT EMIL BARTH.

Witnesses:
  HENRY HASPER,
  WOLDEMAR HAUPT.